United States Patent
Vuda et al.

(10) Patent No.: US 12,368,645 B2
(45) Date of Patent: *Jul. 22, 2025

(54) PREDICTIVE ANALYTICS FOR NETWORK TOPOLOGY CHANGES

(71) Applicant: Oracle International Corporation, Redwood Shores, CA (US)

(72) Inventors: Santhosh Kumar Vuda, Bangalore (IN); Kiran Kumar Palukuri, Bangalore (IN); Kumar G Varun, Pleasanton, CA (US); Jerry Paul Russell, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,732

(22) Filed: Sep. 12, 2023

(65) Prior Publication Data
US 2024/0291717 A1     Aug. 29, 2024

Related U.S. Application Data

(60) Provisional application No. 63/448,951, filed on Feb. 28, 2023.

(51) Int. Cl.
*G06F 15/173* (2006.01)
*H04L 41/12* (2022.01)
*H04L 41/147* (2022.01)

(52) U.S. Cl.
CPC ............ *H04L 41/12* (2013.01); *H04L 41/147* (2013.01)

(58) Field of Classification Search
CPC .............................. H04L 41/12; H04L 41/147
See application file for complete search history.

(56) References Cited

U.S. PATENT DOCUMENTS

| | | | |
|---|---|---|---|
| 10,581,736 B1* | 3/2020 | Choudhury | H04L 43/0876 |
| 11,128,546 B2* | 9/2021 | Pignataro | H04L 41/0897 |
| 11,455,204 B1* | 9/2022 | Nadger | H04L 41/22 |
| 2010/0157788 A1* | 6/2010 | Ellis | H04L 43/0829 370/216 |
| 2017/0331694 A1* | 11/2017 | Crickett | H04L 41/0836 |
| 2019/0280942 A1 | 9/2019 | Côté et al. | |
| 2020/0057933 A1 | 2/2020 | Cosgrove et al. | |
| 2020/0322367 A1 | 10/2020 | Salvat Lozano et al. | |
| 2020/0344150 A1* | 10/2020 | Vasseur | H04L 45/08 |
| 2022/0210015 A1* | 6/2022 | Barritt | H04L 45/22 |

\* cited by examiner

*Primary Examiner* — Padma Mundur
(74) *Attorney, Agent, or Firm* — Invoke

(57) ABSTRACT

Techniques for recommending plans to remediate a network topologies are disclosed. The techniques include logging network topology information identifying relationships between entities in a network topology over a number of time periods. The techniques also include, using the logged network topology information, predicting characteristics of the network at a future time period. The techniques further include computing a signature based on the predicted characteristics and, using the signature, determining whether the predicted characteristics meet remediation criteria. Additionally, the techniques include, in response to determining the predicted characteristics meet the remediation criteria, determining a remediation plan for the current network topology and presenting the plan to a user.

27 Claims, 14 Drawing Sheets

PREDICTIVE ANALYTICS FOR NETWORK TOPOLOGY CHANGES

BENEFIT CLAIMS; RELATED APPLICATIONS; INCORPORATION BY REFERENCE

The following application is hereby incorporated by reference: application No. 63/448,951, filed Feb. 28, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to network management, and, more specifically, to determining and analyzing relationships between network entities.

BACKGROUND

Cloud networks can be large, geographically dispersed systems comprised of dynamically changing hardware and software that serves multiple clients. Building, deploying, and managing complex cloud networks can be extremely difficult. Accordingly, network providers use orchestration systems, such as Kubernetes, to deploy and manage cloud networks. Even using an orchestration system, network providers may not comprehend the relationships between entities of the network, such as services, nodes, and pods. Without such comprehension, network providers cannot optimally visualize or manage their networks.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TOPOLOGY ANALYSIS ENVIRONMENT
3. TOPOLOGY ANALYSIS SYSTEM
4. TOPOLOGY ANALYSIS PROCESS
5. REMEDIATION PLANNING ENVIRONMENT
6. REMEDIATION ANALYSIS SYSTEM
7. REMEDIATION ANALYSIS FLOW
8. REMEDIATION ANALYSIS PROCESS
9. HARDWARE OVERVIEW
10. MISCELLANEOUS; EXTENSIONS

1. General Overview

Embodiments determine relationships in a network topology, predict future characteristics of the relationships, and recommend plans to remediate the network topology to prevent future anomalies and failures in the network. One or more embodiments include a system that logs network topology information identifying relationships between entities in a network topology over a number of time periods. Using the logged network topology information, the system predicts characteristics of the network at a future time period. The system computes a signature based on the predicted characteristics and, using the signature, determines whether the predicted characteristics meet remediation criteria. In response to determining the predicted characteristics meet the remediation criteria, the system determines a remediation plan for the current network topology and presents the plan to a user.

One or more embodiments described in this Specification and/or recited in the claims may not be included in this General Overview section.

2. Topology Analysis Environment

Figure 1:
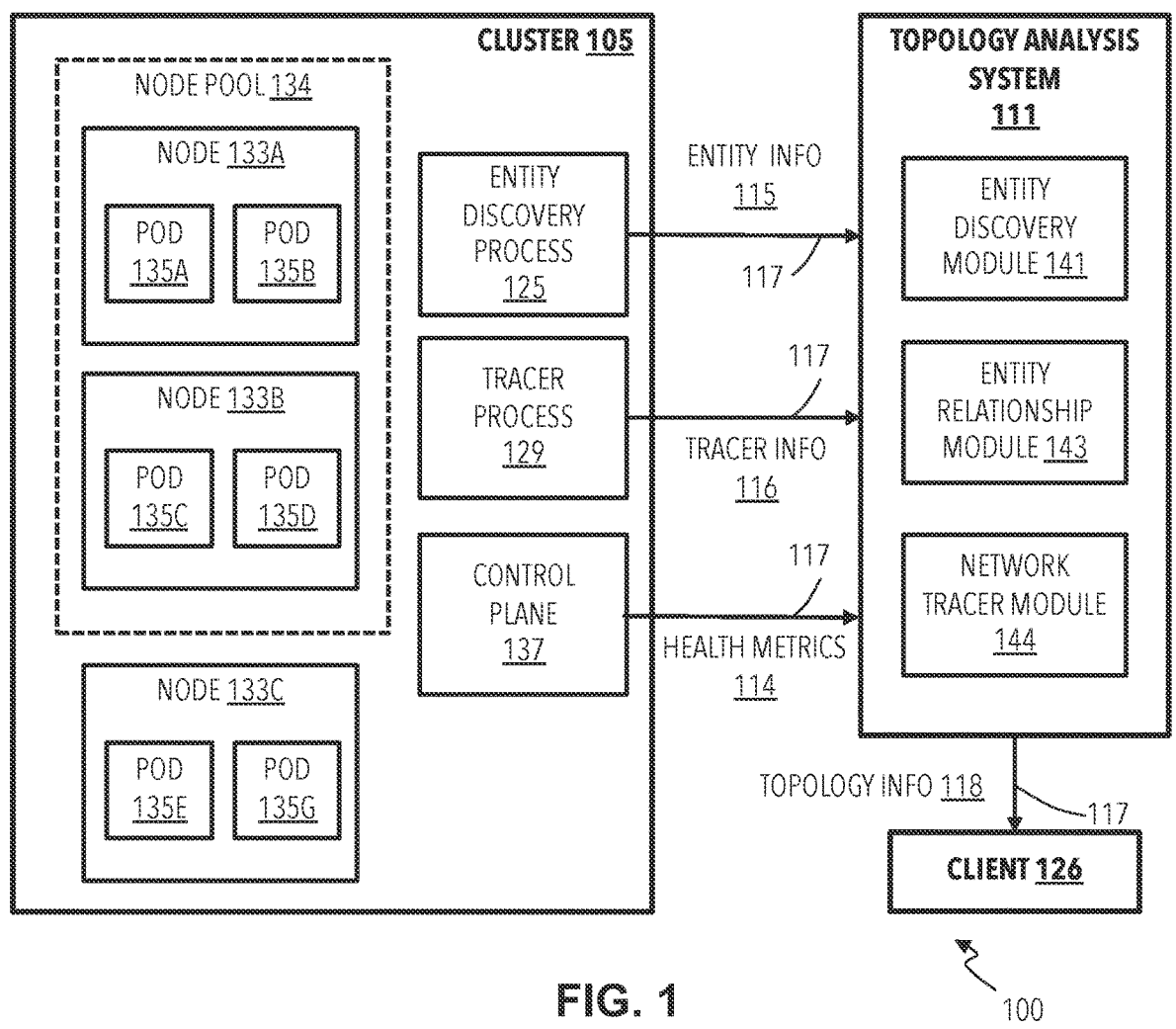
FIG. 1 illustrates a functional block diagram of an example system environment for analyzing network topologies in accordance with one or more embodiments.

FIG. 1 shows a system block diagram illustrating an example of a topology analysis environment 100 for implementing systems and processes in accordance with one or more embodiments. The computing environment 100 includes a cluster 105, a topology analysis system 111, and a client 126 communicatively connected, directly or indirectly via one or more communication links 117. The communication links 117 can be wired and/or wireless information communication channels, such as the Internet, an intranet, an Ethernet network, a wireline network, a wireless network, a mobile communications network, and/or another communication network.

The cluster 105 can be a logical collection of network entities ("entities"), including nodes 133, other software and/or hardware components within a network, such as a firewall or servers, etc. The entities can be interconnected by one or more communication networks (not shown), such as a wide area network or a local area network, which work together to support applications and middleware, such as relational databases. The cluster 105 can be one of a number of clusters or virtual clusters, wherein individual clusters and their pods, services, and the like are identified by a respective namespace. Each node 133 can be a computing system (e.g., a server) running an instance of an operating system. The cluster 105 can organize combinations of the nodes 133 (e.g., nodes 133A and 133B) into pools, such as node pool 134, in which all the nodes are assigned to the same task assigned by a control plane 137. One or more of embodiments of the cluster 105 comprises a KUBERNETES cluster. KUBERNETES is a software system that orchestrates clusters by bundling tasks performed by the nodes 133 into containers. For example, KUBERNETES can scale the number of containers running, and ensure the containers are efficiently distributed across the nodes 133. Pods 135 are set of one or more containers deployed to a single node 133 having shared storage and network resources. Containers of a pod 135 are co-located and co-scheduled, and run in a shared context.

An orchestration tools, such as KUBERNETES, distributes and manages services and workloads across the nodes 133 of the cluster 105. Services are abstractions representing applications running on a set of pods 135. Services can be applications, software components, or functionalities that are made available to users or other systems. Services can have relationships with other services and workloads. A service defines an endpoint across the respective set of pods 135 associated with it having a single, stable IP address and DNS name usable to access the set of pods 135. For example, a ClusterIP is a type of service providing a stable internal IP address accessible within the cluster 105 allowing communication between services inside the cluster. A NodePort is a type of service on a static port on each nodes 133 Internet protocol that enables external access to the NodePort service by mapping the NodePort to the service's ClusterIP. Workloads are applications executed on one or more of the pods 135 within the cluster 105 that perform tasks or processes that fulfill the requirements of the services. Workloads can include various types of computations, data processing, storage operations, and communication between the nodes 133. Workloads can be categorized into different types based on their characteristics, such as: compute, data, networking, storage, batch, real-time, and machine learning.

One or more embodiments of the cluster 105 can include an entity discovery process 125 and a network tracer process 129. The entity discovery process 125 can be a monitoring process, such as a daemon, executed in the cluster 105 that collects and stores entity information 115 from an application program interface (API), such as a KUBERNETES API, executed using a control plane 137 or one of the nodes 133. The network tracer process 129 can be a monitoring process executed by one of the pods 135 across all the nodes 133 of the cluster 105. The network tracer process 129 can continuously or periodically run a service, such as a customized TCPConnect BPF program based on the BPF Compiler Collection (BCC), that generates tracer information 116 by collecting outbound traffic from the nodes 133. BCC is a toolkit available in LINUX® that creates efficient kernel tracing and manipulation programs that use extended BPF. For example, the network tracer process 129 can execute a TCPConnect program collecting outbound traffic (e.g., TCP connections) initiated from individual nodes 133 capturing information such as Command name, Source IP address, Destination IP address, Destination Port, Port ID, and the like.

The control plane 137 can be one or more components that manage the cluster 105. The control plane 137 can include an API Server through which the control plane 137 communicates with the nodes 133, the services, and the client 126 of the cluster 105. The control plane 137 can also include a scheduler that assigns pods 135 to nodes 133 in the cluster 105 based on factors, such as resource requirements, node capacity, and the like. The control plane 137 can further include a manager that optimizes the cluster 105 based on health metrics 114. For example, the control plane 137 can execute a node controller that manages the nodes 133, a replication controller that ensures a desired number of pods 135, and a service controller that handles network services. The control plane 137 can generate the health metrics 114 for the cluster 105, including, for example: node status (e.g., healthy, unhealthy, failed), node capacity (e.g., CPU, memory, and/or storage utilization), node uptime (e.g., amount of time each node has been running without any interruptions or restarts), pod density (e.g., number of pods running on each node), pod status (e.g., pods running, pending, or terminated states), pod restart count, deployment replicas, service availability, events (e.g., errors, warnings, or anomalies), and cluster scaling (e.g., a number of nodes in the cluster), status of the object (e.g., pod, node, workload), problem priority labels derived from the application logs being collected from the pods, number of restarts on the containers inside the pod, unbound volumes, and the like.

The topology analysis system 111 can be an orchestration system, such as KUBERNETES. The topology analysis system can also log and present topology information 118 in a display representing the entity information and service relationships in the cluster 105. The topology analysis system 111 can include entity discovery module 141, entity relationship module 143, and network tracer module 144. The entity discovery module 141 can receive and log entity information 115 discovered by the entity discovery process 125. Additionally, the entity discovery module 141 can associate information that uniquely identifies and maps service relationship information to the cluster 105 (which may be a KUBERNETES cluster), such as tenancy ID, a cluster ID, and a cluster name.

The entity relationship module 143 can be software, hardware, or a combination thereof that generates a set of relationships/mappings using the entity information 115 determined by the entity discovery process 125, which is used to determine service-to-service relationships (actual and intended) in the cluster 105 (pod-to-pod, pod-to-service, deployment-to-service, etc.) using the tracer information 116 generated by the tracer process 129.

The network tracer module 144 can be software, hardware, or a combination thereof that determines relationships between the service-to-service and/or service-to-workload entity-types in the cluster 105. The network tracer module 144 can use the tracer information 116 (e.g., periodic TCP connect information), along with the entity relationship information generated by the entity relationship module 143 to derive the relationships among services and workloads across the cluster 105. As detailed below, the relationship information can be used to generate relationship maps and network topologies for the cluster 105.

The client 126 can be one or more computing devices allowing users to access and interact with the topology analysis system 111 to manage the cluster 105 and visualize topology information 118. For example, the client 126 can be a personal computer, workstation, server, mobile device, mobile phone, tablet device, processor, and/or other processing device capable of implementing and/or executing server processes, software, applications, etc. The client 126 can include one or more processors that process software or other computer-readable instructions and include a memory to store the software, computer-readable instructions, and data. The client 126 can also include a communication device to communicate with topology analysis system 111 via the communication links 117. Additionally, the client 126 can generate a computer-user interface enabling a user to interact with the topology analysis system 111 using input/output devices. For example, by way of a computer-user interface, a user can connect to the topology analysis system 111 to manage, update, and troubleshoot the cluster 105, and to display topology information 118.

3. Topology Analysis System

Figure 2:
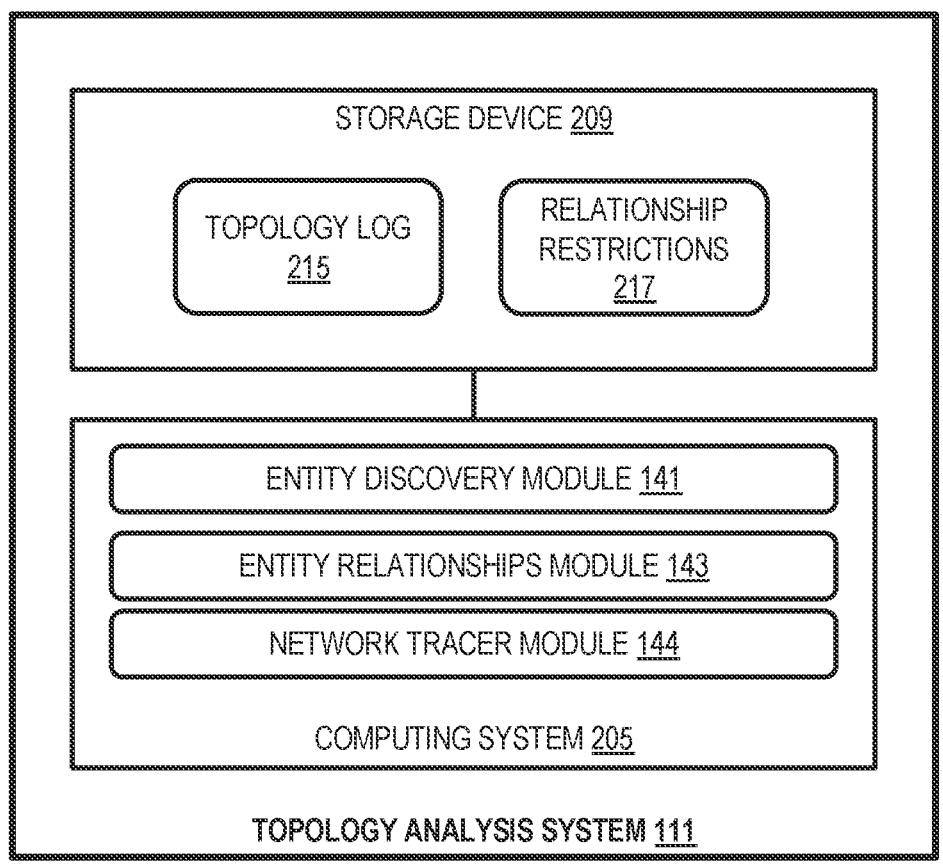
FIG. 2 illustrates a block diagram of an example topology analysis system in accordance with one or more embodiments.

FIG. 2 shows a system block diagram illustrating an example of a topology analysis system 111 in accordance with one or more embodiments, which can be the same or similar to that described above. The topology analysis system 111 includes hardware and software that perform processes and functions disclosed herein. The topology analysis system 111 can include a computing system 205 and a storage system 209. The computing system 205 can include one or more processors (e.g., microprocessor, microchip, or application-specific integrated circuit).

The storage system 209 can comprise one or more non-transitory computer-readable, hardware storage devices that store information and program instructions executable to perform the processes and functions disclosed herein. For example, the storage system 209 can include one or more flash drives and/or hard disk drives. One or more embodiments of the storage system 209 store information for entity discovery module 141, entity relationship module 143, and network tracer module 144. Additionally, the storage system 209 can store a network topology log 215 and relationship restrictions 217. The network topology log 215 can be a time-indexed library of network topology information. The relationship restrictions 217 can be a library of rules defining permitted and/or unpermitted relationships for entities in a network.

The computing system 205 can execute an entity discovery module 141, an entity relationships module 143, a network tracer module 144, which can be software, hardware, or a combination thereof, that perform operations and processes described herein. The entity discovery module 141, the entity relationships module 143, and the network tracer module 144 can be the same or similar to those described above.

It is noted that the computing system 205 can comprise any general-purpose computing article of manufacture capable of executing computer program instructions installed thereon (e.g., a personal computer, server, etc.). However, the computing system 205 is only representative of various possible equivalent-computing devices that can perform the operations and processes described herein. To this extent, in embodiments, the functionality provided by the computing system 205 can be any combination of general and/or specific purpose hardware and/or computer program instructions. In each embodiment, the program instructions and hardware can be created using standard programming and engineering techniques, respectively.

The entities illustrated in FIG. 2 may be implemented in software and/or hardware. Each entity may be distributed over multiple applications and/or machines. Multiple entities may be combined into one application and/or machine. Operations described with respect to one entity may instead be performed by another entity.

4. Topology Analysis Process

Figure 3A:
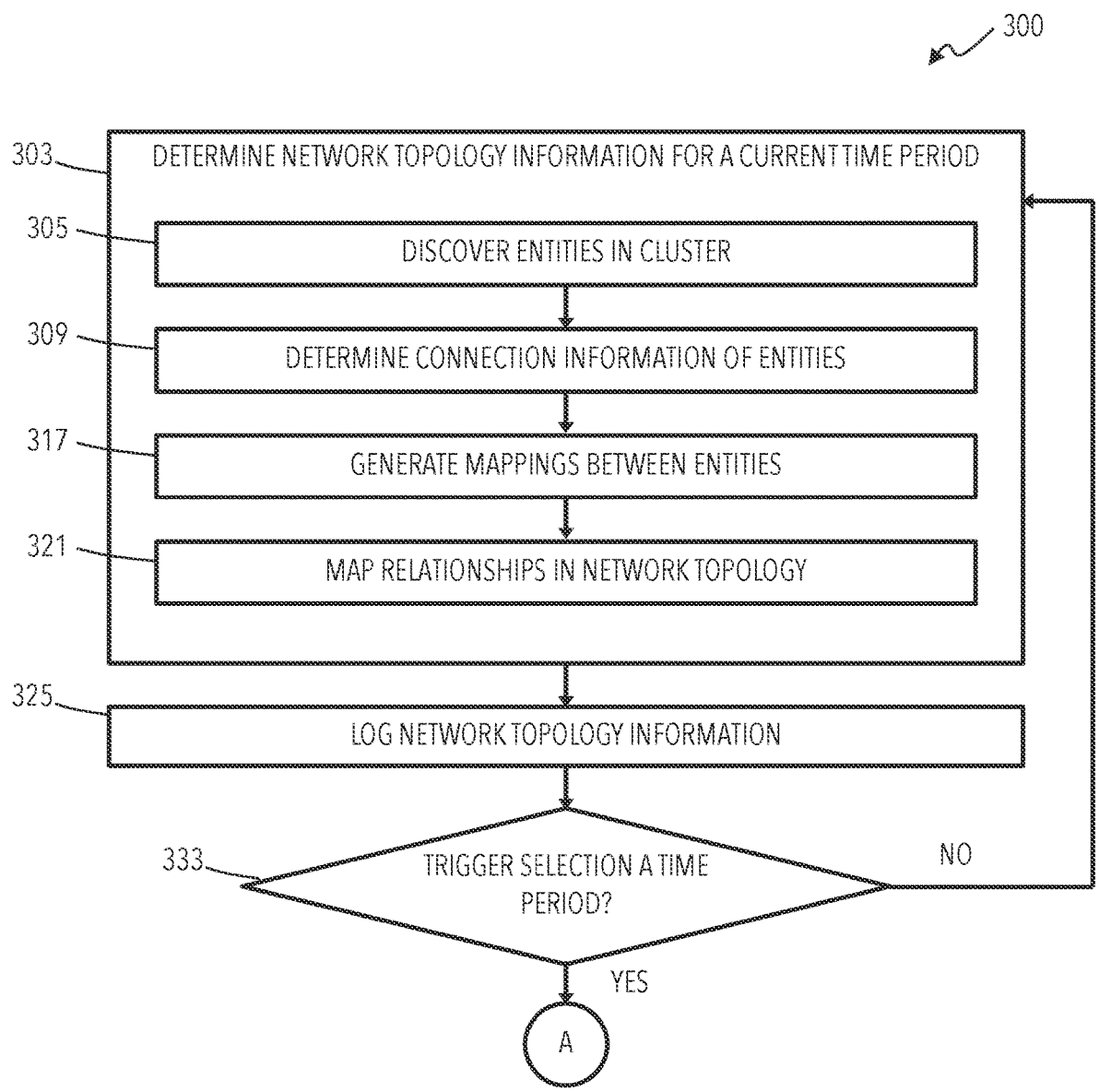
FIGS. 3A and 3B illustrate a set of operations of an example process for analyzing network topologies in accordance with one or more embodiments.
Figure 3B:
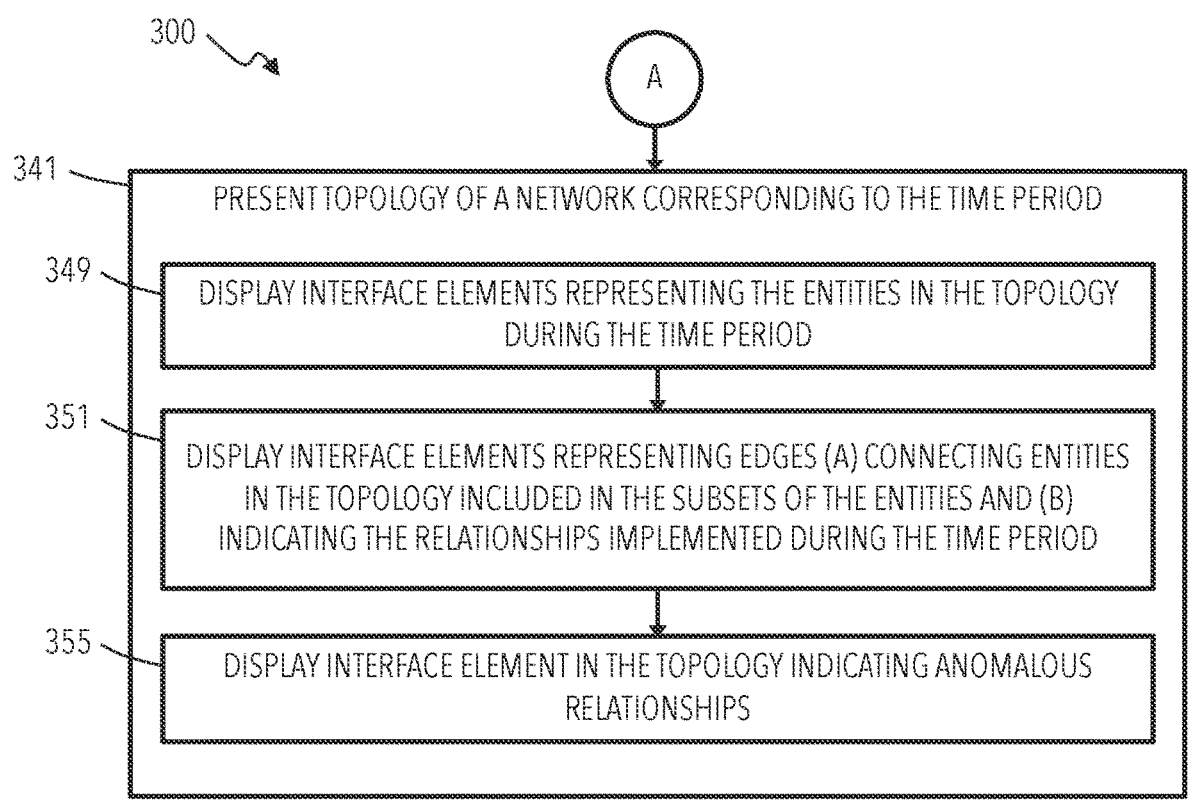

FIGS. 3A and 3B illustrate a set of operations of an example process 300 for identifying relationships between entities of the network, based on network topologies detected over time. Referring to FIG. 3A, at block 303 a system (e.g., topology analysis system 111) determines network topology information for a current time period. The time period can be a fixed window, such as every 30 seconds, minute, hour, day, etc. Determining the network topology information can include, at block 305, discovering information of entities (e.g., using entity discovery module 141) included in one or more clusters (e.g., cluster 105). One or more embodiments periodically execute queries (e.g., every 30 seconds) in the cluster that request the entity information for entity types that may be in the cluster. For example, the system can periodically execute a KUBERNETES job (e.g., a CronJob) that generates the entity information. The entity information can include metadata of the entities included in the one or more clusters. For example, the entity information obtained by a query can include entity names, namespaces, kinds, unique identifiers (UIDs) and internet protocol (IP) addresses. Entity types can include, for example, node (e.g., node 133), pod (e.g., pod 135), deployment, ReplicaSet, a DaemonSet, a StatefulSet, Job, CronJob, Ingress, Service, and Endpoint/EndpointSlice.

One or more embodiments collect different entity information for different entity types. For example, the entity information of the clusters can include, for example: Cluster Name and Cluster ID. The entity information for the nodes can include: Node Name, Entity UID (unique identifier), internal IP address (e.g., private network IP addresses), and external IP address (e.g., public network IP addresses). The entity information of the pods can include, for example: Entity Name, Namespace Name, Entity UID, Pod IP address, and Node IP address. The entity information of the ReplicaSet/job can include, for example: Entity Name, Namespace Name, Entity UID, Controller Kind (e.g., Deployment and CrobJob), Controller Name, and Controller UID. The entity information of the Deployments, DaemonSets, StatefulSets and CronJobs can include, for example: Entity Name, Namespace Name, and Entity UID. The entity information of the Services can include, for example: Service, Namespace Name, and Entity UID, Cluster IP address, External IP address, Service type and Ports information. The entity information of the EndpointSlices can include, for example: EndpointSlice, Namespace Name, and Entity UID, Endpoints, and Ports.

Determining the network topology information can also include, at block 309, determining connection information describing connections between entities, including the entities discovered at block 305. One or more embodiments collect the tracer information using eEPF to determine the connection information for all the nodes of the cluster. For example, a pod can continuously run a TCPConnect BPF program that periodically (e.g., every 30 seconds) collects outbound traffic from individual nodes by using TCP connects. TCPConnect can capture the following information, for example: command, source IP, destination IP, destination port, count, and other relevant information. The Command information identifies a command which initiated the connection. Source IP identifies an IP address form which connection is initiated. The Destination IP information identifies an IP address to which the connection is directed. The Destination Port information identifies the port on the IP to which the connection is initiated. The Count information is a number of connections for the combination of the command, source IP, destination IP, destination port in particular trace interval.

Determining the network topology information can also include, at block 317, generating (e.g., by executing entity relationship module 143) mappings, such as pod-to-pod, pod-to-service, deployment-to-service, and the like, using the entity information determined at block 305 and/or the tracer information determined at block 309. The mappings can be a set of predefined relationships usable to determine other relationships, such as described below regarding block 349. Generating the mappings can include periodically fetching current the information (e.g., from storage system 209), determining the mappings, and storing the results back to the storage system. Examples of pre-defined mappings (1) to (5) are described below.

$$\text{Cluster } ID + \text{Namespace} + \text{Pod} = > \text{Service} + \text{Namespace} \quad (1)$$

Mapping (1) above can be used to derive a service to which a Pod belongs using the unique combination of cluster ID, namespace, and Entity Name. The Cluster ID can be an identifier of a cluster (e.g., cluster 105). A Namespace can be an identifier of a virtual cluster within the cluster. A Pod can be a set of one or more containers deployed to a single node of the cluster.

Mapping (1) can be created using endpoint and pod information included in the entity information. Endpoint information can include Endpoints/EndpointSlices generated by, for example, a KUBERNETES control plane (e.g., control plane 137). Mapping (1) can also be used to enrich information logged in the storage system. As an example of generating mapping (1), for services named in the entity information the system can identify corresponding Endpoint/EndpointSlice information including the service name (e.g., Follower_Service). Additionally, the Endpoint/EndpointSlice information can include IP addresses of one or more pods (e.g., 10.244.4.14) exposed for communication by the service. Using the IP address, the system can perform a text search of the entity information to identify a particular pod having the IP address, determine the name of the pod (e.g., Pod_A), and map the Entity Name to the service (e.g., Pod_A=>Follower_Service). It should be noted, the present examples are assumed to be within the same cluster having a same namespace and, therefore, have been excluded from the example mappings for the sake of explanation.

$$\text{Cluster } ID + \text{Namespace} + \text{Pod} = > \textit{WorkloadType} + \text{Namespace} \quad (2)$$

Mapping (2) can be used to enrich the data stored in the storage system by adding an additional metadata field based on WorkloadType, where the value corresponds to a workload type's identifier. A WorkloadType can be a classification or a descriptor of an application running in the cluster based on, for example, processing load, permanence (e.g., static, or dynamic), and task (e.g., ReplicaSet, Deployment/ DaemonSet, StatefulSet, Job, CronJob, and the like). As an example of generating mapping (2), for a ReplicaSet name identified in the entity information (e.g., alpha_replicaset), the system can determine the controller kind (e.g., Deployment). Then, having determined the controller kind/workload type (e.g., Deployment), the system can identify the controller/workload in the entity information (e.g., alpha_deployment) by text search for the deployment name. Because the name of the pod follows the deployment name, the system can identify a pod (e.g., Pod_B) based on the deployment name and map the pod to the workload type (e.g., Pod_B=>alpha_deployment).

$$\text{Cluster } ID + IP + \text{Port} = > \text{Service} + \text{Namespace} \quad (3)$$

Mapping (3) can be used to determine an individual combination of an IP address and a Port belonging to a service (or exposed through a service). For example, mapping (3) can be used to identify services corresponding to a destination IP address and port for building service-to-service and/or pod/WorkloadType-to-Service relationships. IP can be an IP address of an entity in the cluster. The port is an identifier of a connection through which an entity in the cluster communicates (e.g., a transmission control protocol (TCP) port). Service can be an identifier of an abstraction used to expose an application running on a set of pods in the cluster. Mapping (3) can be determined using Endpoint/EndpointSlice and service information included in the entity information. Endpoint/EndpointSlice information contains Pod IP and Port combinations, and service information contains IP and Port combinations. As an example of generating mapping (3), the entity information collected for a service (e.g., Alpha_Service) can include a Cluster IP address of the service (e.g., 10.96.224.67) and port of the service (e.g., 6379). The system can generate map using the IP address and the port to the service determine the mapping (e.g., 10.96.224.67+6379=>Alpha_Service). In addition to cluster IP, external IP, and IP address from end points can be used to determine the mapping (3).

$$\text{Cluster } ID + IP = > \text{Service} + \text{Namespace} \quad (4)$$

Mapping (4) can be used to determine a given IP address belonging to a service (or exposed through a service. Mapping (4) can be created using endpoint/endpoint-slice and Service Entities information available in the entity information. Endpoint/endpoint-slice information contains Pod IP whereas service information contains ClusterIP/External IP. Mapping (4) can also be used to determine a service corresponding to a Source IP. As an example of generating mapping (4), the entity information collected for a service (e.g., Beta_Service) can include a Cluster IP address of the service (e.g., 10.96.0.1) used to determine an example mapping (e.g., 10.96.0.1=>Beta_Service). In addition to cluster IP; external IP, and IP address from end points can be used to determine the mapping (4).

$$\text{Cluster } ID + IP = > \text{Pod} + \text{Namespace} \quad (5)$$

Mapping (5) can be used to determine a given IP belonging to pods in the cluster. As all the pods may not be exposed through services, the system can use mapping (5) identify and map all the pods and the associated Pod IPs. This information can be used to create relationships in an application topology between a pod (or the owner of the pod) and a service in cluster when the source Pod does not belong to any service in cluster. Mapping (5) can be created using Pod Entity information available in the entity information. The system can use mapping (5) to identify a particular Pod corresponding to a Source IP. Additionally, mapping (5) can be used to derive a WorkloadType-to-Service relationships in a topology. As an example of generating mapping (5), the entity information collected for a pod (e.g., Pod_C) includes an IP address of the pod (e.g., 10.244.2.47) used to determine the mapping (e.g., 10.244.2.47=>Pod_C).

It is understood that ambiguities can occur when generating the mappings (1) to (5) above (which can be specific to a KUBERNETES cluster). One or more embodiments avoid ambiguities arising from generating the mappings (1) to (5) by exempting pods using host Network, such as KUBERNETES system pods including kube-proxy, kube-flannel, etc., and corresponding entities.

Determining the network topology information can further include, at block 321, mapping service-to-service relationships and workload-to-service relationships. Mapping the relationships can include identifying services corresponding to individual destinations. The correspondences between individual destination services and individual connections can be determined using the mappings generated at block 317 and the entities discovered at block 305. As previously described, the connection identified by the tracer information can include command name, source IP address, destination IP address, destination port, and port ID. For example, using the mappings, the system can determine a particular service associated with a destination IP address and port of a particular connection in the tracer information. More specifically, an example connection identified by the tracer information can have a command name "discovery_service," a source IP "10.244.2.101," a destination IP "10.99.111.102," and a destination Port "8005." Using the predefined mapping (3), the system can text search the entity information to identify a service "discovery_service_server" corresponding to IP address "10.99.111.102" and port "8005," which corresponds to the example destination IP and port included in the tracer information.

Mapping the relationships in block 321 can also include identifying services and workloads corresponding to individual sources. The system can determine correspondences between individual source services or workloads and individual connections using the mappings determined at block 317 and the entities discovered at block 305. Using the mappings, the system can associate the source IP address of the particular connection with a service identified by the mapping. Alternatively, using the mappings, the system can associate the source IP address with a particular pod, service, workload corresponding to the source IP address of the particular connection. For example, using the predefined mapping (5), the system can identify (e.g., by text searching) a pod, "Pod_Delta," having an IP address, "10.244.2.001," matching the source IP in the example tracer information determined at block 309. Based on the identified pod, the system can identify a particular service exposing the pod in the entity information. For example, Pod_Delta may be exposed by a service "discovery_service_info." While the present example describes identifying a service based on an association between an IP address and a pod, it is understood that other associations can be determined based on other mappings determined at block 317. For example, in a same or similar manner, the system can determine associations of IP address with workload type (Deployment, DaemonSet, etc.), or external connections.

The system can generate final relationships using the determined destination services and source services/workload types. For example, the system can map the relationship between the destination service, "discovery_service," and the source service, "discovery_service_info." The mapped relationships can be used to generate a topology identifying network connections for the cluster. The system can periodically update relationships mapped at block 321 in accordance with periodic updates to the entity information and the tracer information. By doing so, the system can update the topology of the cluster to reflect changes in mapped relationships over time and graphically display the changes in a computer-user interface in combination with other metrics of the cluster. The user interface can allow users to efficiently visualize and manage the cluster, in addition to perceiving the cluster's health, load, and potential issues.

At block 325, the system logs the network topology information for the current time period, as determined at block 303. Logging the network topology information can include storing the entities discovered at block 305 with respective relationships mapped at block 321 in a time-indexed log (e.g., network topology log 215). Logging the network topology information can also include updating metadata corresponding to the entities and relationships included in the network topology. For example, the metadata can identify types of entities and relationships included in the network topology, the duration of the relationships, and health metrics of the entities. The entity metadata can include information discovered at block 305, such as entity names, namespaces, kinds, unique identifiers (UIDs) and internet protocol (IP) addresses. Entity types can include, for example, node, pod, deployment, ReplicaSet, a DaemonSet, a StatefulSet, Job, CronJob, Ingress, Service, and Endpoint/EndpointSlice. The relationship types can be selected from a set including, for example: external, service, database, node, and workload. The system can determine the type metadata from the connection, mapping, and/or relationship information. For example, using the information determined at block 309, the system can determine that a service is related to an external device via an external IP address. The duration metadata can be selected from a set including, for example, constant, intermittent, periodic, transitory, and the like. The system can determine the duration metadata by, for individual relationships in each time period, maintaining a count of the number of consecutive periods in which a relationship is maintained and corresponding time periods for the consecutive periods. The system can determine the health metrics based on information of the entities and relationship monitored the network (e.g., control plane 137), such as load, usage, bandwidth, latency, response time, etc.

At block 333, the system determines whether a selection of a time period has been triggered. The trigger can be an event, such as a passage of time (e.g., a periodic or scheduled time). The trigger can also be an event occurring in the network, such as the addition or removal of an entity in the cluster. The trigger can also be a condition occurring in the network, such as a health metric exceeding a predetermined threshold. The trigger can also be a manual input from a user. For example, via a user interface of a client device (e.g., client 126), a user can enter a time period (e.g., a current or past time period) for which the user desires to view the network topology information. If no trigger occurs at block 333 (e.g., block 333 is "No"), then the process 300 can iteratively return to block 303 and continue determine and log network topology information. On the other hand, if the system determines that a trigger occurred (e.g., block 333 is "Yes"), then the process 300 can proceed to block 341 of FIG. 3B, as indicated by off-page connector "A."

Figure 4:
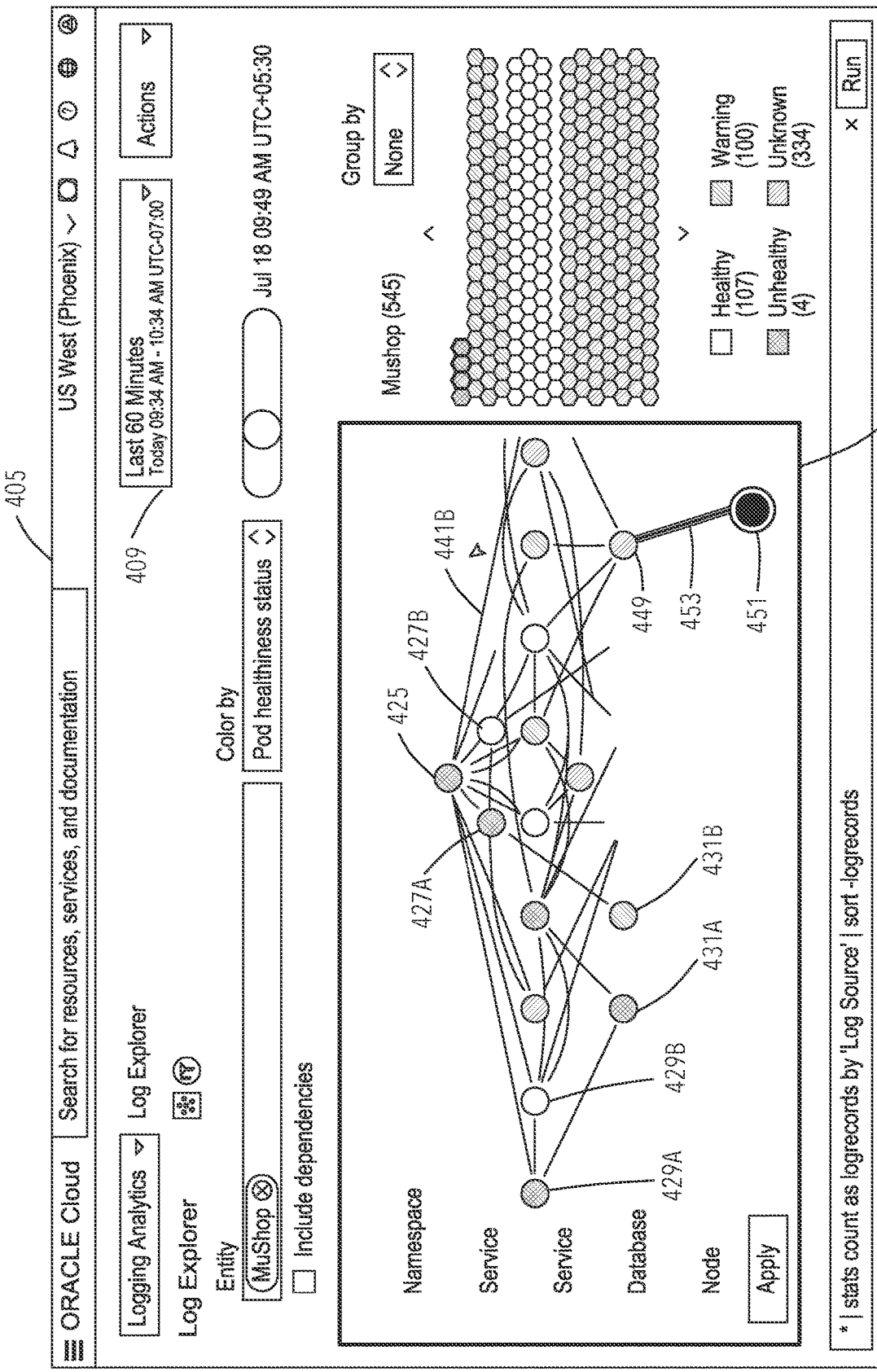
FIG. 4 illustrates an example screen of a graphic user interface presenting a network topology in accordance with one or more embodiments.

Proceeding to FIG. 3B, as indicated by off-page connector "A," at block 341, the system presents a topology of a network corresponding to the time period of the event using a display device. Presenting the topology at block 341 can include a block 349, displaying interface elements representing the entities in the topology during the time period of event triggered at block 333. For example, as illustrated in FIG. 4, the computer-user interface 405 can display interface elements, such as interface elements 425, 427, 429, 431, 449, and 451 in the topology 415 as icons representing the entities discovered by the monitoring process during the time period. The interface elements representing the entities can be arranged in hierarchical layers based on their entity types, corresponding to the labels of the topology 415, such as namespace, services, databases, and nodes.

Presenting the topology can also include, at block 351, displaying interface elements representing edges (A) connecting entities included in the subsets of the entities and (B) indicating the relationships identified during the time period. For example, as illustrated in FIG. 4, the computer-user interface 405 can display interface elements, such as interface elements 441 and 453 in the topology 415, as lines (e.g., edges) representing relationships between the entities.

Presenting the topology can also include, at block 355, displaying interface elements representing anomalous relationships determined at block 337. The system can present interface elements with indicators, such as bold lines, colors, shading, different sizes, visual pulsing, alphanumeric text, or the like, and combinations thereof. The indicators can represent respective event types, if any, corresponding to the individual entities, and the magnitude of the events. For example, interface elements implemented during the current analysis period can be highlighted using bold lines and outlines to distinguish new entities and relationships from existing entities and relationships. Also, for example, the system can color interface element one of green, yellow, or red indicating a respective health of the entities and relationships.

5. Remediation Planning Environment

Figure 5:
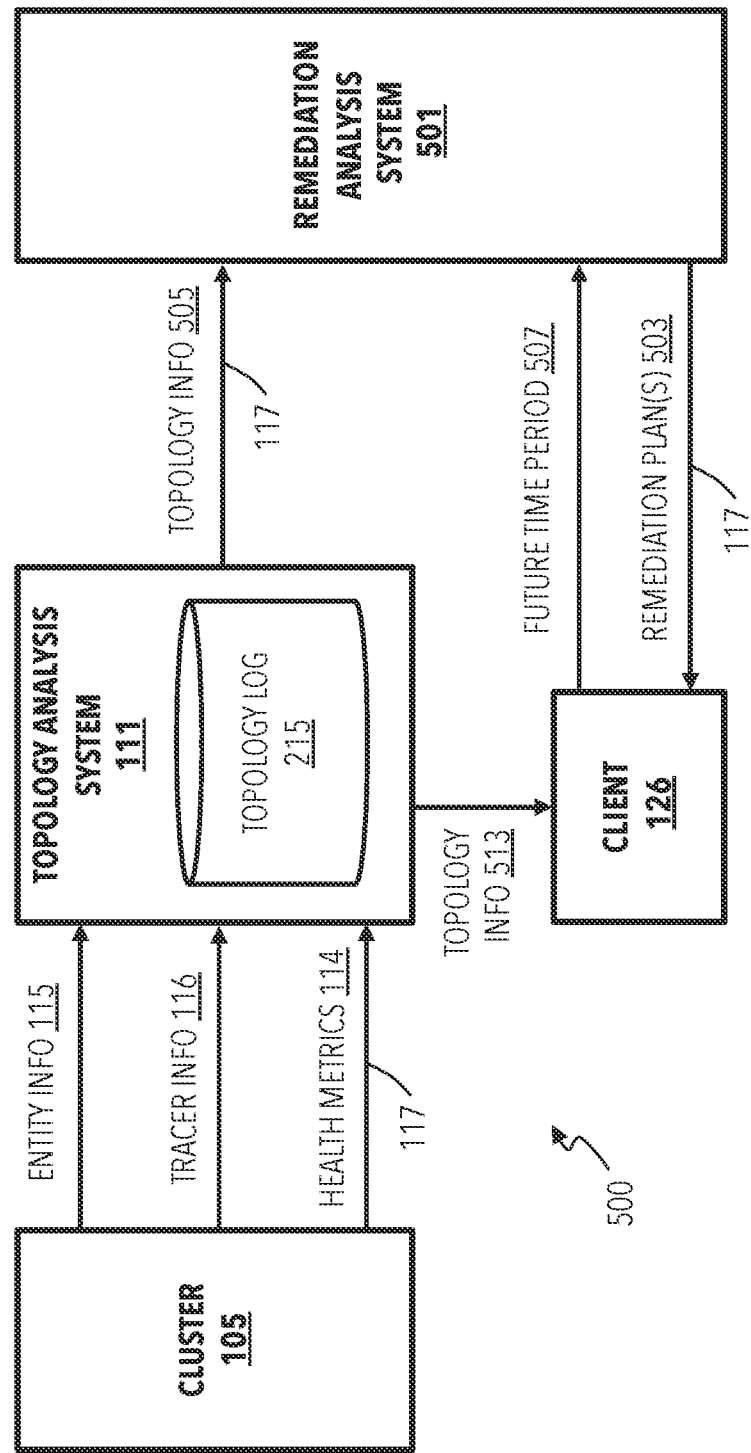
FIG. 5 illustrates a functional block diagram of an example system environment for determining remediation plans based on network topologies in accordance with one or more embodiments.

FIG. 5 shows a system block diagram illustrating an example of a remediation planning environment 500 for implementing systems and processes in accordance with one or more embodiments. The environment 500 includes a network cluster 105, a topology analysis system 111, and a client 126 communicatively connected, directly or indirectly via one or more communication links 117. The cluster 105, the topology analysis system 111 and the client 126 can be the same or similar to those previously discussed above. Additionally, the environment 500 can include a remediation analysis system 501, which can be one or more computing devices that determine remediation plans 503 for remediating current or predicted issues in the cluster 105 based on topology information 505 generated by the topology analysis system 111.

As detailed above, the topology analysis system 111 periodically determines network topologies (e.g., topology 415 in FIG. 4) using health metrics 114, entity information 115, and tracer information 116 obtained from the cluster 105 (e.g., using entity discovery process 125 and tracer process 129). The topology analysis system 111 can store the network topology information in a time-indexed topology log 215. Using the topology information 505 obtained from the topology log 215, the remediation analysis system 501 predicts characteristics of the cluster 105 at a future time period 507. The predicted characteristics can include information associated with events, anomalies, and health issues in the cluster 105 at the future time period 507.

The remediation analysis system 501 can determine whether the predicted characteristics meet one or more remediation criteria. The remediation criteria can be threshold values for one or more of the predicted characteristics and/or combinations of the predicted characteristics. For example, the criteria can trigger the determination of remediation plans 503 when one or more predicted characteristics exceed corresponding thresholds or combinations of thresholds.

Responsive to determining the predicted characteristics meet one or more remediation criteria, the remediation analysis system 501 determines one or more candidate remediation plans, which indicate changes to the current topology to avoid or mitigate the predicted future characteristic meeting the remediation criteria. For example, a particular remediation plan can recommend adding additional pods to a node, deprecating a node, updating a firewall, and the like. Additionally, by applying one or more rules, some embodiments select a single remediation plan 503 from the one or more of the candidate remediation plans for communication to the client 126. For example, the remediation analysis system can rank candidate remediation plans based on respective costs and present a recommended remediation plan 503 having the lowest cost at the client 126.

While FIG. 5 illustrates the cluster 105, the topology analysis system 111, the client 126, and the remediation analysis system 501 as separate, it is understood that embodiments can combine one or more of the cluster 105, the topology analysis system 111, the client 126, and the remediation analysis system 501 into a single system. For example, some embodiments combine the functionality of the topology analysis system 111 and the remediation analysis system 501. Additionally, it is understood that the functionality of one or more of the cluster 105, the topology analysis system 111, the more client 126, and the remediation analysis system 501 can be divided into separate systems.

6. Remediation Analysis System

Figure 6:
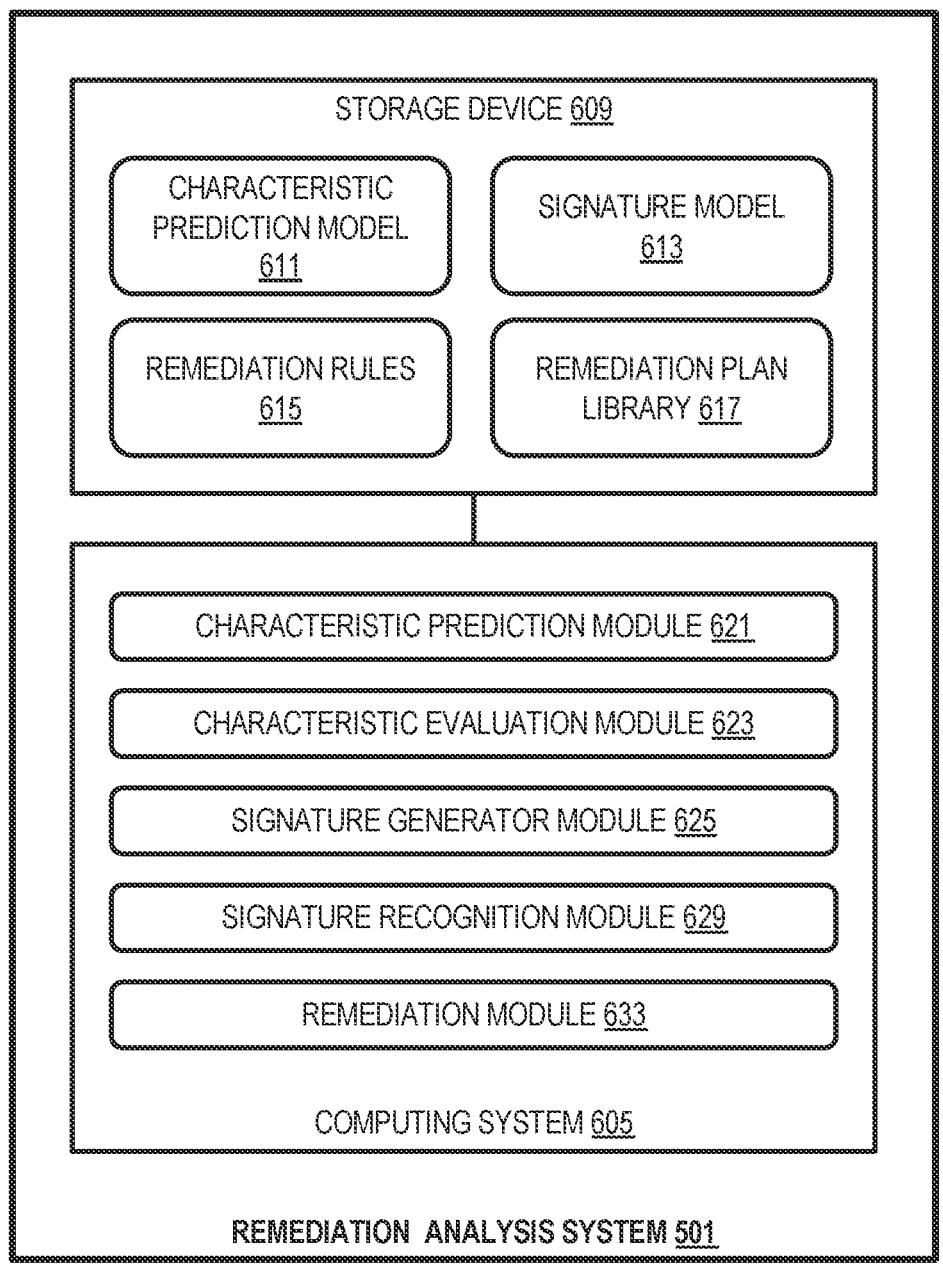
FIG. 6 illustrates a block diagram of an example remediation analysis system in accordance with one or more embodiments.

FIG. 6 shows a system block diagram illustrating an example of a remediation analysis system 501, which can be the same or similar to that described above. The remediation analysis system 501 includes hardware and software that perform processes and functions disclosed herein. The remediation analysis system 501 can include a computing system 605 and a storage system 609, which can be the same or similar to those previously described above (e.g., computing system 205 and storage system 209).

The storage system 609 can store a characteristic prediction model 611, a signature model 613, remediation rules 615, and remediation plans. 617. The characteristic prediction model 611 can be a set of rules, an algorithm, or a trained machine learning model configured to predict characteristics based on patterns of relationships and/or health metrics occurring in a network topology over time. The signature model 613 can be a set of rules, an algorithm, or a trained machine learning model configured to identify candidate remediation plans based on the predicted characteristics. The remediation rules 615 can be a library of rules defining criteria for triggering network remediation planning based on the predicted characteristics. The rules can be threshold values for individual characteristics or combinations of characteristics. For example, a rule may indicate that remediation of an entity is necessary if a load is greater than the first threshold or response time is less than the second threshold. The remediation plan library 617 can be one or more datasets associating remediation plans (e.g., remediation plan 503) with corresponding topology signatures. The remediation plans can include changes to a network topology, such as rebooting a node, deploying additional pods or nodes, removing a node, allocating a node to a service, redirecting traffic to a different node, adding or reconfiguring a network load balancer, and the like. The remediation plans 617 can also include modifying workloads, such as deleting a workload, reconfiguring a workload, and scaling a workload. The remediations plan can further include adding or modifying security policies, such as updating or reconfiguring a firewall, and generating an alert. The topology signatures can be a value or a set of values corresponding to topologies for which the remediation plans were previously implemented.

Additionally, the computing system 605 can execute a characteristic prediction module 621, a characteristic evaluation module 623, a signature generator module 625, a signature recognition module 629, and a remediation module 633, which can each be software, hardware, or a combinations thereof, to perform the operation and processes described herein. The characteristic prediction module 621 determines predicted topology characteristics at a future time period (e.g., future time period 507). Some embodiments of the characteristic prediction module 621 use modeling tools that simulate the behavior of the cluster to predict future states. The network modeling tools can use algorithms and mathematical models to analyze relationships and health metrics included in historical topology information (e.g., topology log 215) to predict future network topologies and characteristics.

The characteristic evaluation module 623 evaluates the predicted characteristics determined by the characteristic prediction module 621 based on the remediation rules 615. For example, responsive to applying remediation rules 615 to characteristics of a current topology, the characteristic evaluation module 623 can trigger determination of one or more remediation plans (e.g., remediation plans 503).

The signature generation module 625 transforms the predicted topology characteristics into a predicted topology signature. The signature can be a structured representation of the predicted characteristics, such as vector or a schema. Some embodiments convert the predicted topology characteristics into tokens representing the individual characteristics. Some other embodiments convert the predicted topology characteristics into a fixed-length vector representing the set of characteristics. Techniques for generating the signature from the predicted topology characteristics can include, for example: One-Hot Encoding, Bag of Words (BoW), Term Frequency-Inverse Document Frequency (TF-IDF), Word2Vec, Doc2Vec, BERT (Bidirectional Encoder Representations from Transformers), Encoder-Decoder Models, and Character-level Encoding.

The signature recognition module 629 determines candidate remediation plans by associating the predicted topology signature to one or more signatures associated with remediation plans. Some embodiments of the signature recognition module 629 include a machine learning model, such as signature model 613, trained to identify candidate remediation plans corresponding to signatures of historical network topologies that are similar to predicted topology signatures. Some other embodiments of the signature recognition module 629 determine remediation plans by identifying historical signatures similar to the predicted topology signature using similarity functions, such as a probability search or a cosine search.

The remediation module 633 analyzes a set of candidate remediation plans and selects one or more of the plans. Some embodiments selects the one or more remediation plans based on a set of rules or criteria. Some other embodiments of the remediation module 633 determine the cost of implementing the candidate remediation plans. The cost can be a value representing the relative financial, operational, and/or resource costs of the candidate remediation plans. The cost can be scored by assigning a cost value to each change to the network included in the respective remediation plan, such as adding an entity, removing an entity, updating an entity, and the like. The remediation module 633 can determine a net score for individual candidate remediation plans and rank the candidate remediation plans based on their respective net score.

It is noted that the computing system 605 can comprise any general-purpose computing article of manufacture capable of executing computer program instructions installed thereon (e.g., a personal computer, server, etc.). However, the computing system 605 is only representative of various possible equivalent-computing devices that can perform the operations and processes described herein. To this extent, in embodiments, the functionality provided by the computing system 605 can be any combination of general and/or specific purpose hardware and/or computer program instructions. In each embodiment, the program instructions and hardware can be created using standard programming and engineering techniques, respectively.

The entities illustrated in FIG. 6 may be implemented in software and/or hardware. Each entity may be distributed over multiple applications and/or machines. Multiple entities may be combined into one application and/or machine. Operations described with respect to one entity may instead be performed by another entity.

7. Remediation Analysis Flow

Figure 7:
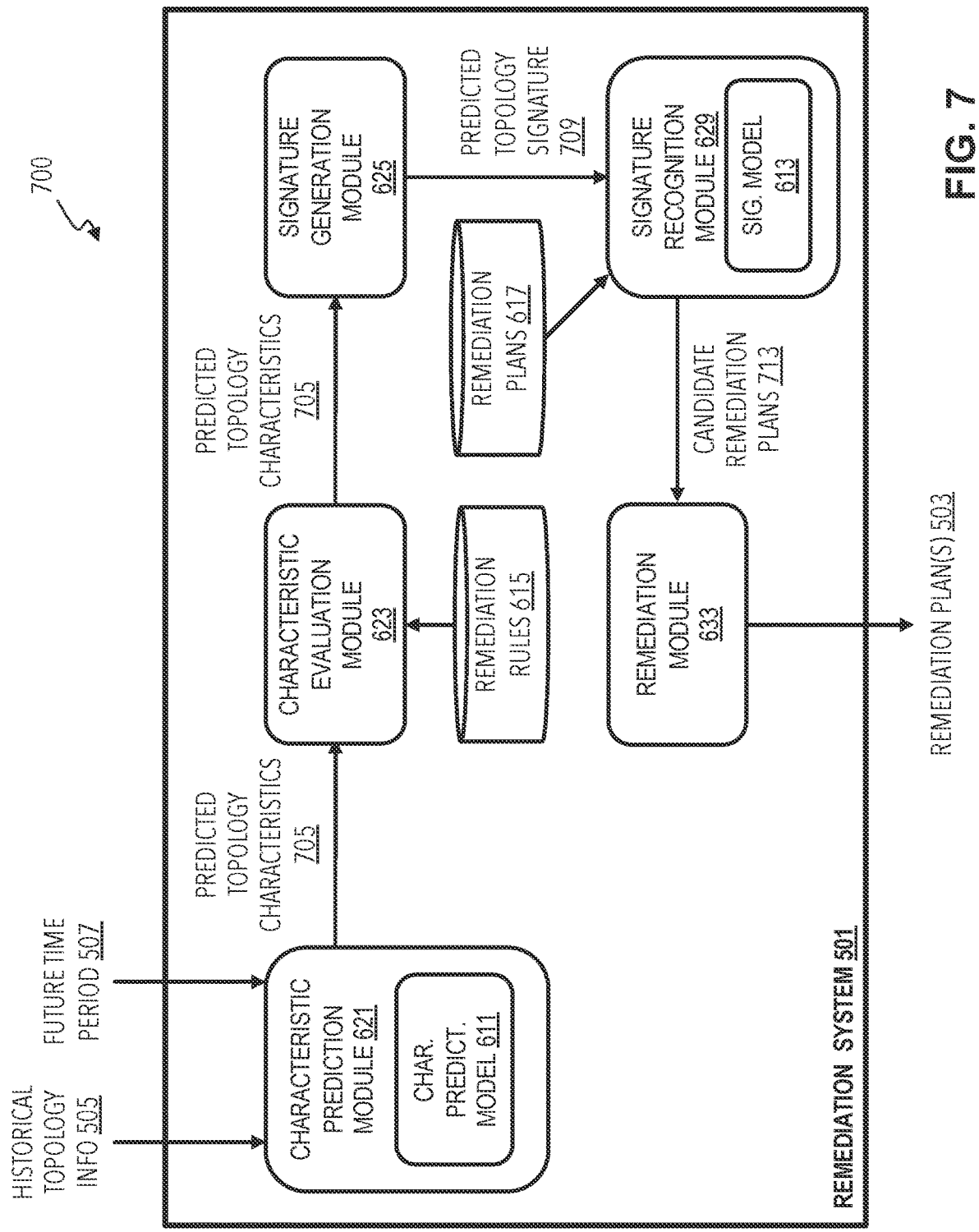
FIG. 7 illustrates a functional flow block diagram of an example remediation analysis system in accordance with one or more embodiments.

FIG. 7 shows a functional flow block diagram 700 of an example remediation analysis system 501. Embodiments of the remediation system 501 outputs a remediation plan 503 for a cluster (e.g., cluster 105) based on historical topology information 505 (e.g., obtained from topology log 215) and a future time period 507 (e.g., obtained from a user of client 126). For example, a user may request a remediation plan 503 implementable in the cluster for a current time period to remediate potential anomalies during the future time period 507. Based on the historical topology information 505, the remediation system 501 can determine whether predicted characteristics of the topology 705 at the future time period 507 satisfy remediation rules 615 and, if so, determines one or more remediation plans 503.

As described above, the characteristic prediction module 621 can determine predicted topology characteristics 705 of the cluster at the future time period 507 based on the historical topology information 505. As described above, the characteristic prediction module 621 can determine predicted topology characteristics 705 using the characteristic prediction model 611 at the future time period 507. Next, the characteristic evaluation module 623 can evaluate whether the predicted topology characteristics 705 meet one or more criteria by applying remediation rules 615. For example, the characteristic evaluation module 623 can determine that one or more of the predicted characteristics 705 exceed thresholds defined by the remediation rules 615.

Responsive to determining that the characteristics 705 meet at least one remediation criteria, the signature generation module 625 transforms the predicted topology characteristics 705 into a predicted topology signature 709. Some embodiments of the signature generation module 625 transform the predicted topology signature 709 into a vector. Some other embodiments map the elements of the predicted topology characteristics 705 into a predefined schema.

Based on the predicted topology signature 709, the signature recognition module 629 determines a set of one or more candidate remediation plans 713. The signature recognition module 629 determines the set by identifying candidate remediation plans 713 having signatures similar to the predicted topology signature 709. Some embodiments determine the set of candidate remediation plans 713 by calculating a similarity between the predicted topology signature 709 and the signatures of the candidate remediation plans 713 using similarity functions. Some other embodiments use the signature model 613, which can be a trained machine learning model, to identify candidate remediation plans 713 for the predicted topology signature 709 based on similarities between the predicted topology signature 709 and signatures of the candidate remediations plans 713.

The remediation module 633 analyzes a set of candidate remediation plans 713 and determines one or more of the plans for recommendation. Some embodiments determine a cost associated with each of a set of candidate remediation plans 713 and select one or more of the remediation plans 503, from the set of candidate remediation plans 713, based on the associated costs.

8. Remediation Analysis Process

Figure 8A:
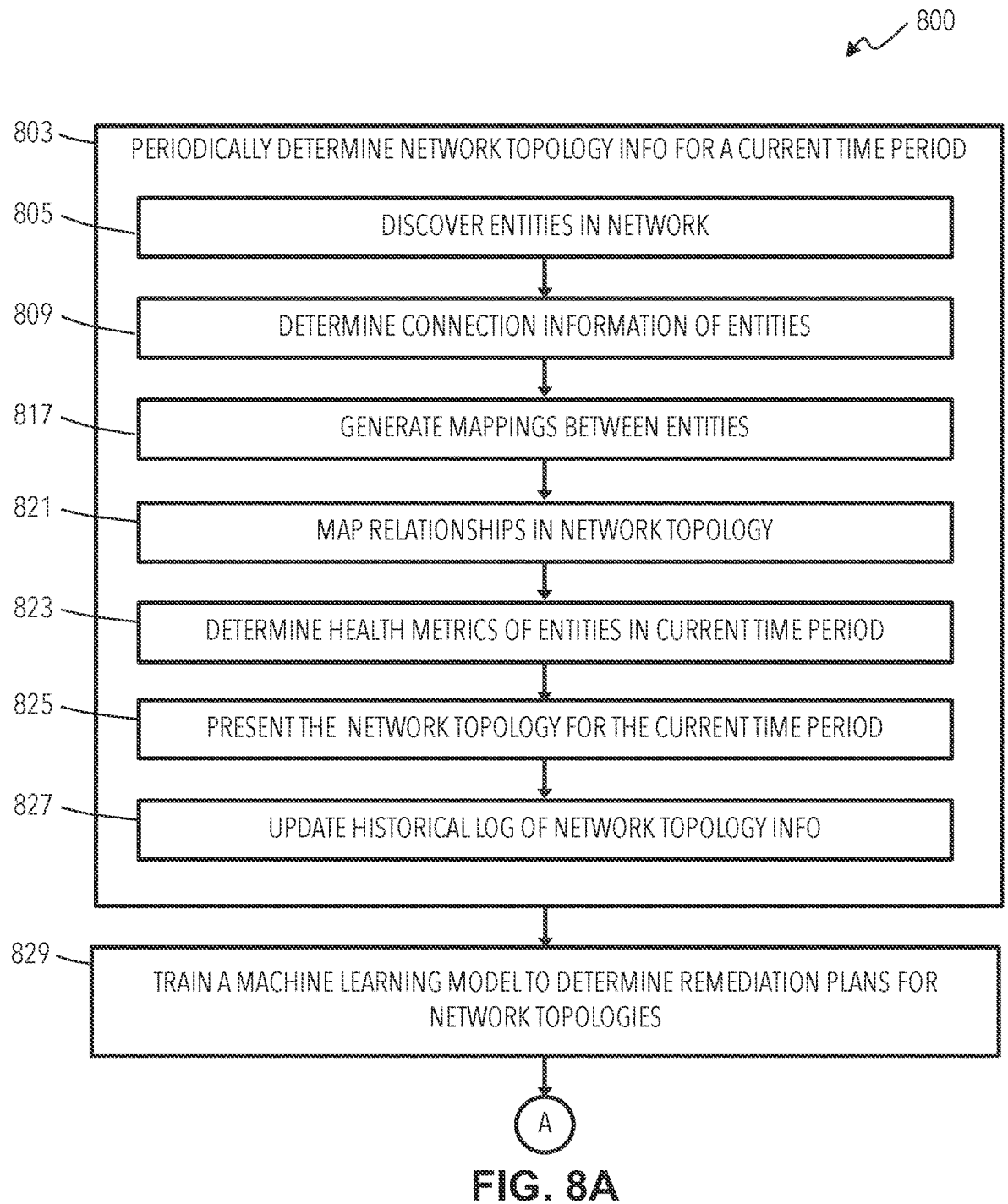
FIGS. 8A, 8B, and 8C illustrate a set of operations of an example process for recommending remediation plans for a network in accordance with one or more embodiments.
Figure 8B:
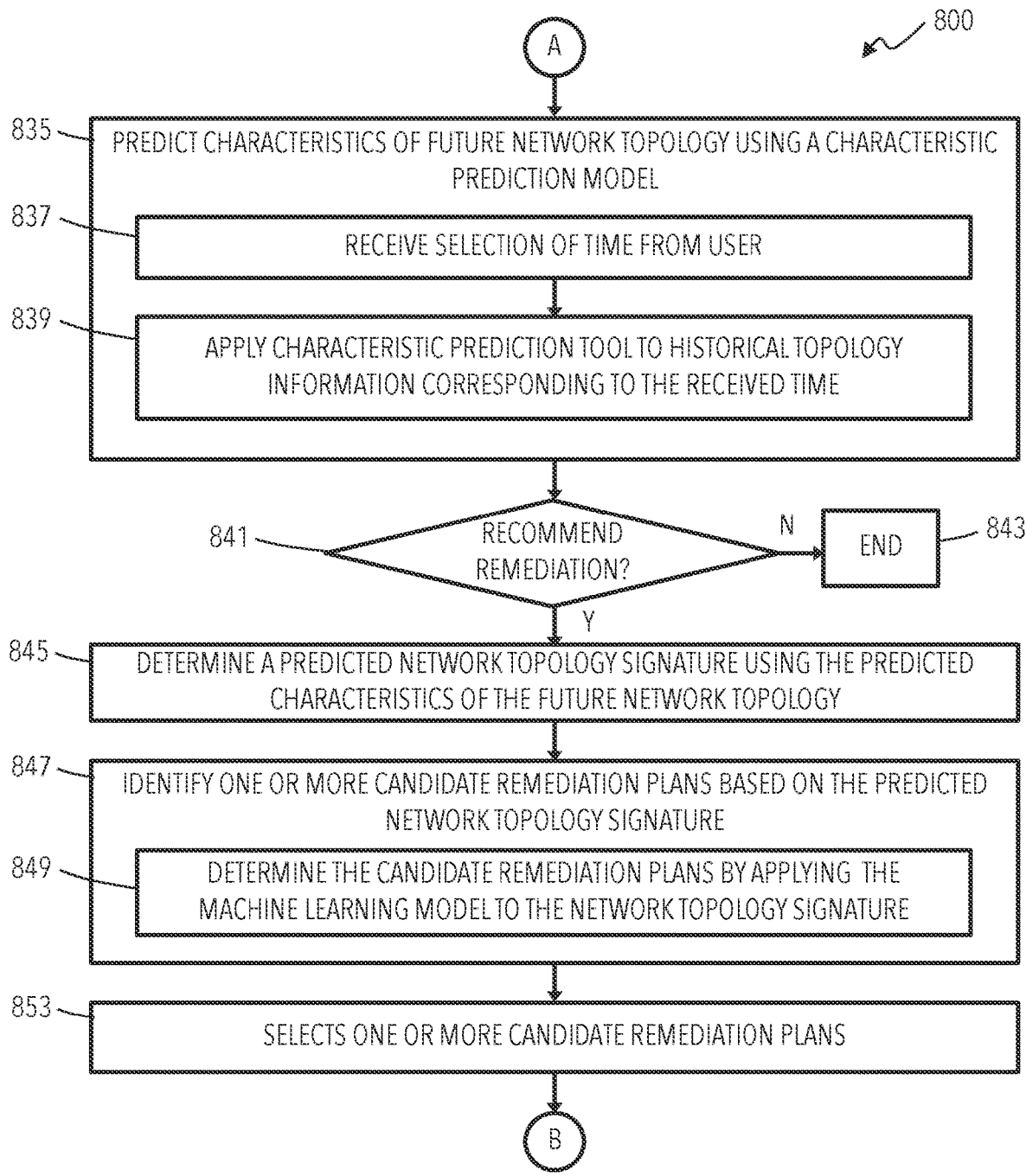
Figure 8C:
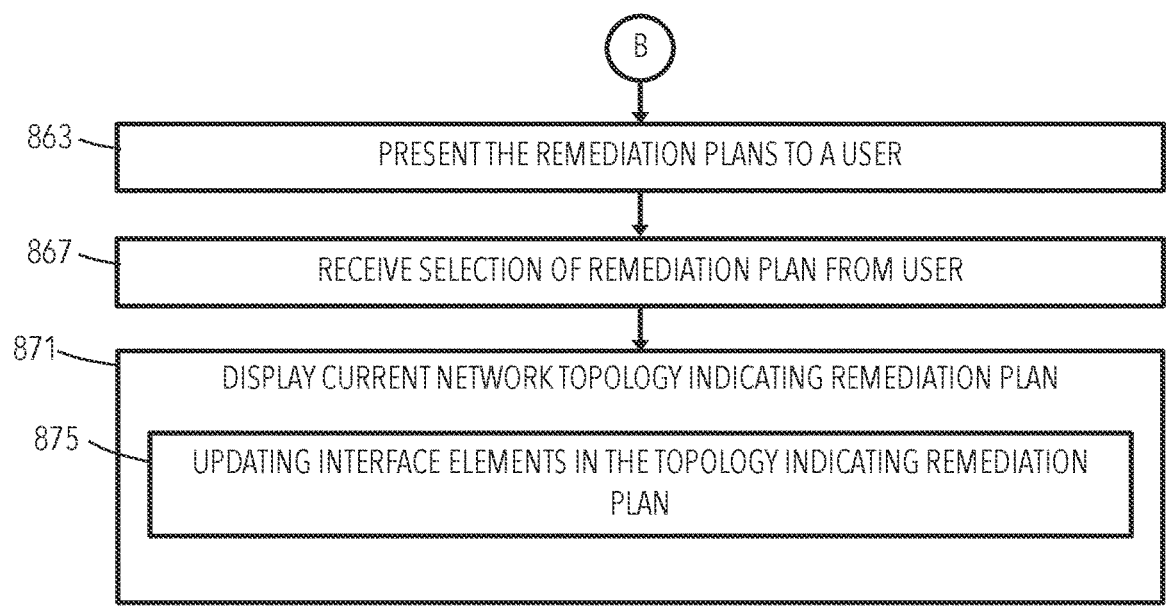

FIGS. 8A, 8B, and 8C illustrate a set of operations of an example process 800 for recommending remediation plans for a network based on predicted characteristics of a network topology. Referring to FIG. 8A, at block 803, a system (e.g., topology analysis system 111) periodically determines network topology information for a current time period (e.g., topology 915 in FIG. 9). The system can determine the network topology information in a same or similar manner to that described at block 303 of FIG. 3A. Determining the network topology information can include, at block 805 (e.g., by executing entity discovery module 141), discovering entities included in a cluster (e.g., cluster 105). At block 809, the system (e.g., executing tracer process 129) determines connections between entities, including the entities discovered at block 805. At block 817, the system (e.g., executing entity relationship module 143) generates mappings between the entities, such as pod-to-pod, pod-to-service, deployment-to-service, and the like, using the entity information determined at block 805 and the tracer information determined at block 809. At block 821, the system maps service-to-service relationships and workload-to-service relationships.

Additionally, at block 823, determining the network topology information can include determining health metrics (e.g., health metrics 114) of the network, entities, and connections in the current time period. For example, the system can determine metrics, such as requests per second (RPS), uptime, error rates, thread count, CPU usage, memory utilization, or disk usage, average response time, peak response times, and the like.

Figure 9:
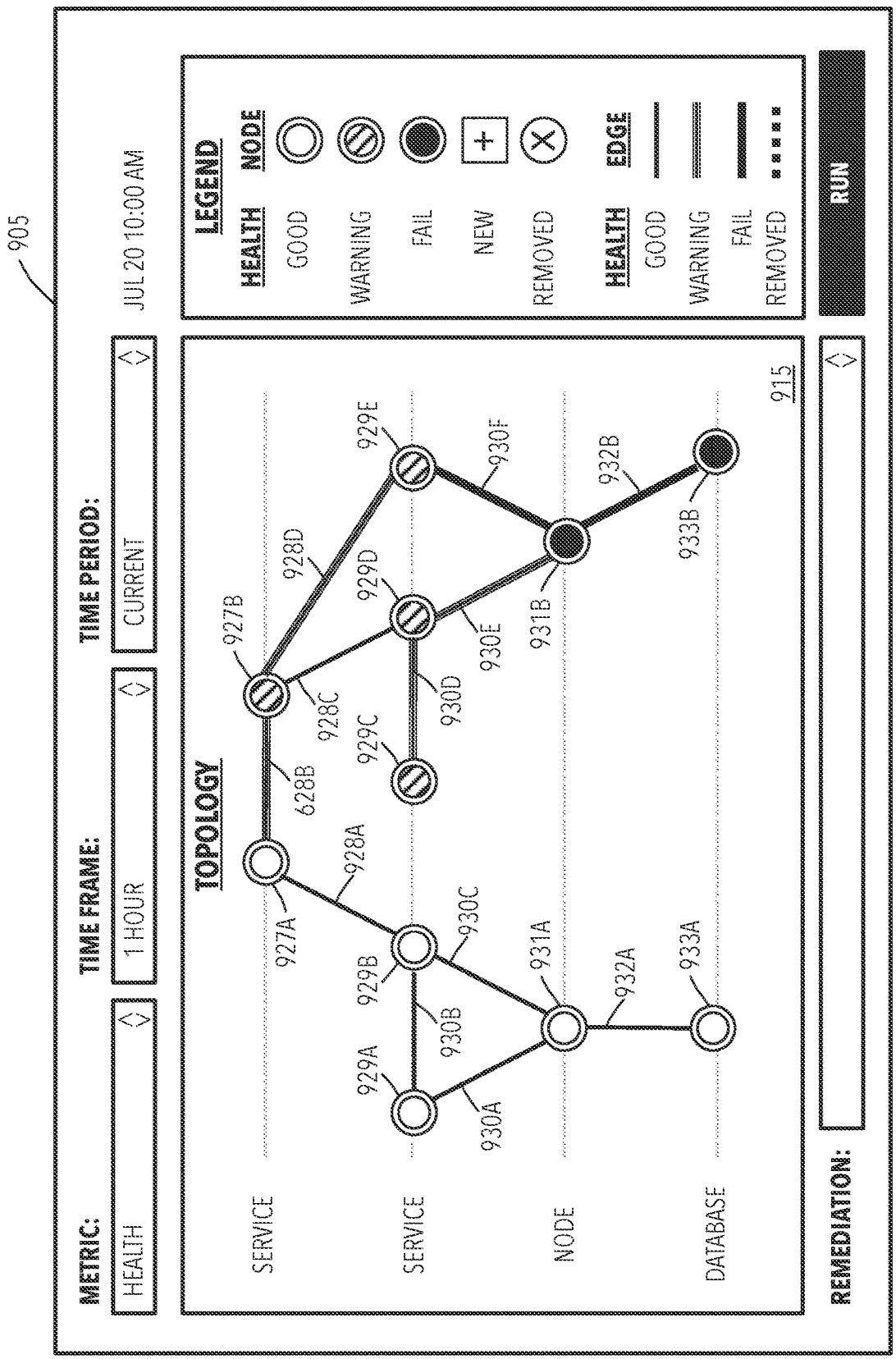
FIG. 9 illustrates an example screen of a graphic user interface presenting example historical network topologies in accordance with one or more embodiments.

Determining the network topology information can also include, at block 825, presenting the network topology information determined for the current time period. The presenting can be performed in a similar manner to that previously described herein (e.g., in relation to FIG. 3B, block 341). Presenting the topology can include displaying interface elements representing the entities in the topology during the current time period at a user device (e.g., client 126). For example, as illustrated in FIG. 9, a computer-user interface 905 can display interface elements, such as interface elements 927, 929, 931, and 933 in the topology 915 as icons representing the entities arranged in hierarchical layers based on their entity types, corresponding to the labels of the topology 915 (e.g., namespace, services, databases, and nodes). Presenting the topology can also include displaying interface elements representing edges connecting entities included in the subsets of the entities and indicating the relationships implemented during the time period. For example, as illustrated in FIG. 9, computer-user interface 905 can present topology 915 including interface elements 928, 930, and 932 in the topology 915, as lines (e.g., edges) representing relationships between the interface elements 927, 929, 931, and 933 representing entities. Presenting the topology 915 can also include displaying interface elements indicating health of the entities and connections. The system can present interface elements with indicators, such as bold lines, colors, shading, different sizes, visual pulsing, alphanumeric text, or the like, and combinations thereof. The indicators can represent respective health states, if any, corresponding to the individual entities, and the magnitude of the states. For example, as shown in FIG. 9, interface elements 931B, 932B, and 933B are displayed using interface elements indicating failures. Also, interface elements 927B, 928C, 929C, 929D, 929E, and 930E are displayed using interface elements indicating warnings.

At block 829, a system (e.g., remediation analysis system 501) trains a machine learning algorithm to identify remediation plans for network topologies. A machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. For example, a label associated with a dataset in the training data may indicate whether the dataset is in one of a set of possible data categories. The training data may be updated based on, for example, feedback on the accuracy of the current target model. Updated training data may be fed back into the machine learning algorithm, which may in turn update the target model.

A machine learning algorithm may generate a target model such that the target model best fits the datasets of the training data to the labels of the training data. Specifically, the machine learning algorithm may generate the target model such that when the target model is applied to the datasets of the training data, a maximum number of results determined by the target model match the labels of the training data. Different target models are generated based on different machine learning algorithms and/or different sets of training data. The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

Some embodiments train the machine learning model using historical topologies (e.g., in topology log 215) associated with corresponding remediations. The training can include selecting some or all of the characteristics of the historical topologies (e.g., health metrics 114) as features, converting the characteristics into a vector, and labeling each vector with a corresponding remediation category. The characteristics can be requests per second (RPS), uptime, error rates, thread count, CPU usage, memory utilization, or disk usage, average response time, peak response times, and the like. For example, a historical topology used for training can include characteristics indicating one or more nodes of the topology have excessive CPU workload. The topology may be associated with a remediation plan that reduced the CPU workload by adding a pod (e.g., pod 135B) to. Training can also include applying a machine learning model to the training vectors to determine a "best fit" between the predicted topology signatures and the signatures of historical topologies. The machine learning model can be one of, for example, a decision tree, a random forest, a support vector machine (SVM), a logistic regression, or a neural network. The system can train the model to classify the vectors based on the provided label by feeding the training data into the chosen model. The machine learning algorithm and model may receive feedback on performance of the implemented remediation plan, and update the set of components and/or dataflow therebetween to improve performance of the model.

Continuing to FIG. 8B, as indicated by off-page connector "A," at block 835, the system predicts characteristics of a network topology in a future time period (e.g., future time period 507) using a characteristic prediction model. Predicting characteristics can include, at block 837, receiving a selection of the future time period from a user via a client device (e.g., client 126).

Predicting at block 835 can also include, at block 839, applying a characteristic prediction tool (e.g., characteristic prediction module 621) to the network topology information. Some embodiments simulate the behavior of a network based on historical topology information. The prediction can be based on a current and/or historical network topologies, including entities and relationships, and health metrics of the network, such as traffic load, user demand, network protocols, routing algorithms, hardware configurations, and various network policies. By inputting past and current network topologies and manipulating parameters such as traffic load, user demand, or hardware upgrades, the system can evaluate the impact on the cluster and predict characteristics of possible future topologies. The modeling tool can use traffic models to simulate realistic network traffic patterns based on the defined parameters and scenarios, simulating the flow of information through the network. The network modeling tools can incorporate algorithms and protocols that control network operations. For example, routing algorithms, load balancing algorithms, congestion control mechanisms, and Quality of Service (QOS) policies are implemented within the modeling tool. The modeling tool uses the input topology, parameters, traffic models, and algorithms to simulate the behavior of the network. Additionally, the modeling tool calculates factors like packet routing paths, network latency, packet loss, throughput, and other performance metrics. The simulation may proceed in discrete time steps, with the tool evaluating the state of the network at each step. Once the simulation is complete, the modeling tool provides predicted topology characteristics (e.g., predicted topology characteristics 705) including predicted health metrics, such as load, usage, and latency, as described above.

Some other embodiments predict future characteristics at block 839 using a machine learning model (e.g., characteristic prediction model 611) comprising a machine learning algorithm trained based on topology relationships over time. The machine learning algorithm can be trained in the same or similar manner to that detailed above. Some embodiments train the characteristic prediction machine learning model using supervised learning using data included of historical topologies (e.g., in topology log 215). The historic data may include metrics, such as entity usage rates, communication rates, and health. Additional historical data may be generated representing changes to the metrics over time. The historical data can be used to generate a training data set. The training data can be associated with labels corresponding to the characteristics.

At block 841, the system determines whether to recommend remediation based on the characteristics predicted at block 835. Some embodiments recommend remediation by applying remediation rules (e.g., remediation rules 615) to the predicted characteristics of the topology. As detailed above, the remediation rules can be threshold values for one or more of the predicted characteristics and/or combinations of the predicted characteristics. If the system determines that none of the remediation rules are satisfied, then the process 800 can end at block 843. On the other hand, if the system determines that the predicted characteristics satisfy at least one remediation rule, then, at block 845 the system determines a network topology signature using the characteristics of the future network topology predicted at block 835. Determining the signature can comprise generating a vector or schema representing the characteristics. For example, the system can use a Longformer model to transform the characteristics into a fixed length vector.

At block 847, the system identifies one or more candidate remediation plans (e.g., candidate remediation plans 713) based on the network topology signature. Some embodiments determine identify candidate remediations plans having signatures similar the predicted topology signature, as previously described. Determining the remediation criterion can include, at block 849, applying the machine learning model trained at block 829 to select one or more candidate remediations plans based on the predicted topology signature.

At block 853, the system selects one or more of the candidate remediation plans for presentation to a user. As described above, some embodiments perform the selection by determining a cost associated with each of a set of candidate remediation plans and selecting one or more of the remediation plans based on the respective costs, as previously described. Continuing to FIG. 8C, as indicated by off-page connector "B," At block 863, the system presents the one or more remediation plans selected at block 853 to a user device (e.g., client 126). At block 867, the system receives from the user device a selection of a remediation plan from the plans presented at block 863.

Figure 10:
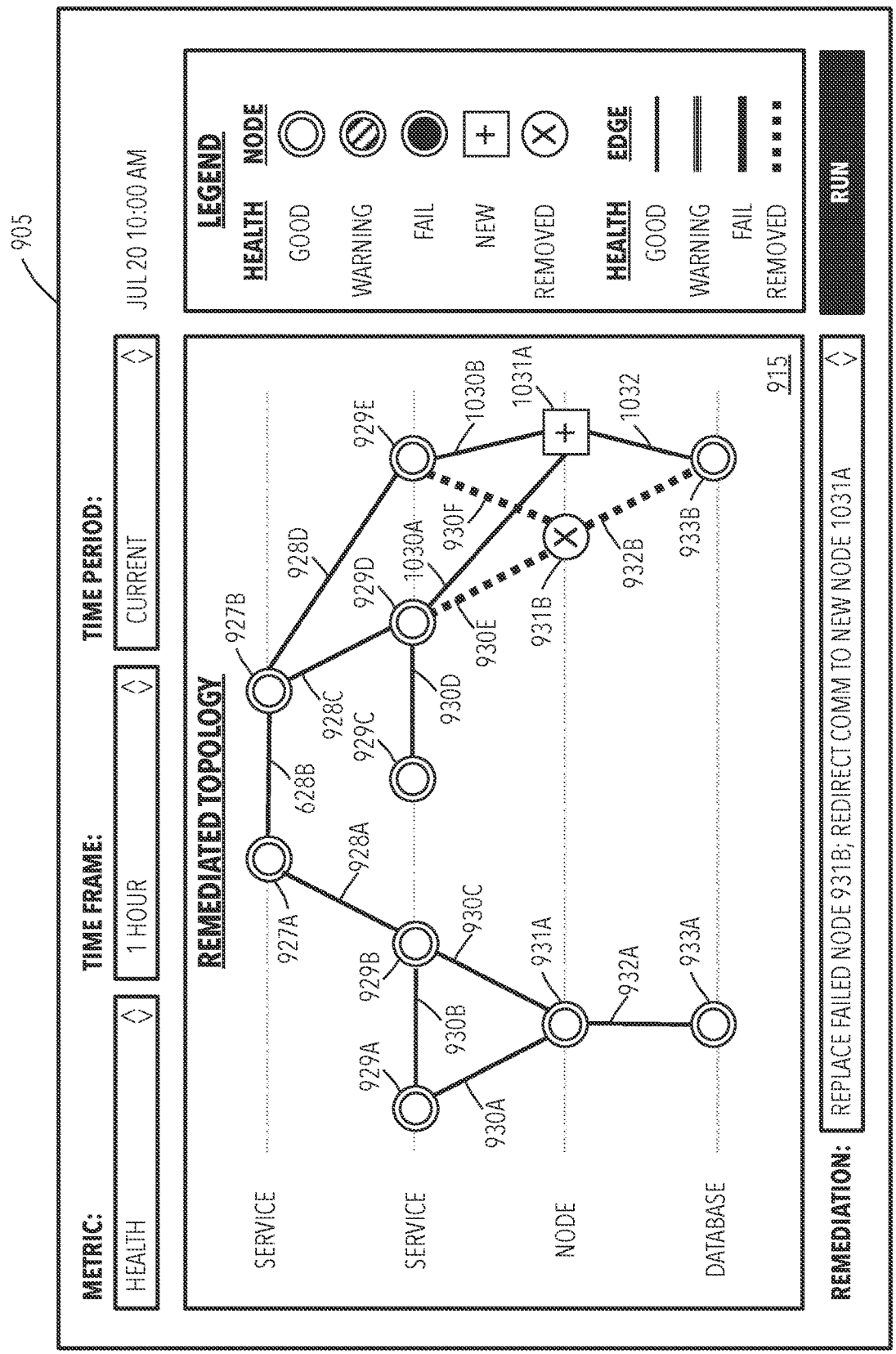
FIG. 10 illustrates an example screen of a graphic user interface presenting an example remediation plan for network topology in accordance with one or more embodiments.

At block 871, the system presents the remediation plan selected at block 867 by displaying interface elements representing the entities in the topology during the current time period. Displaying the remediation plan can include updating the topology presented at block 825 to indicate changes involved in the remediation plan. For example, as illustrated in FIG. 10, the computer-user interface 905 can display interface elements of the current topology 915 shown in FIG. 9 with additional interface elements indicating modifications. More specifically, topology 915 in FIG. 10 indicates removal of interface element 931B, representing a failed node, and the addition of interface elements 1031A representing a node replacing interface element 931B. The topology 915 can also indicate removal of interface elements 930E, 932F, and 932B representing edges previously connected to interface element 931B, and the addition of interface elements 930A, 930B, and 932 representing a node replacing interface elements 930E, 932F, and 932B. Also, the topology 915 can be updated to indicate the health of the interface elements 927B, 928D, 929C, 929D, 929E, 930D, 930F, and 933B to indicate changes in health based on the remediation plan.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 11:
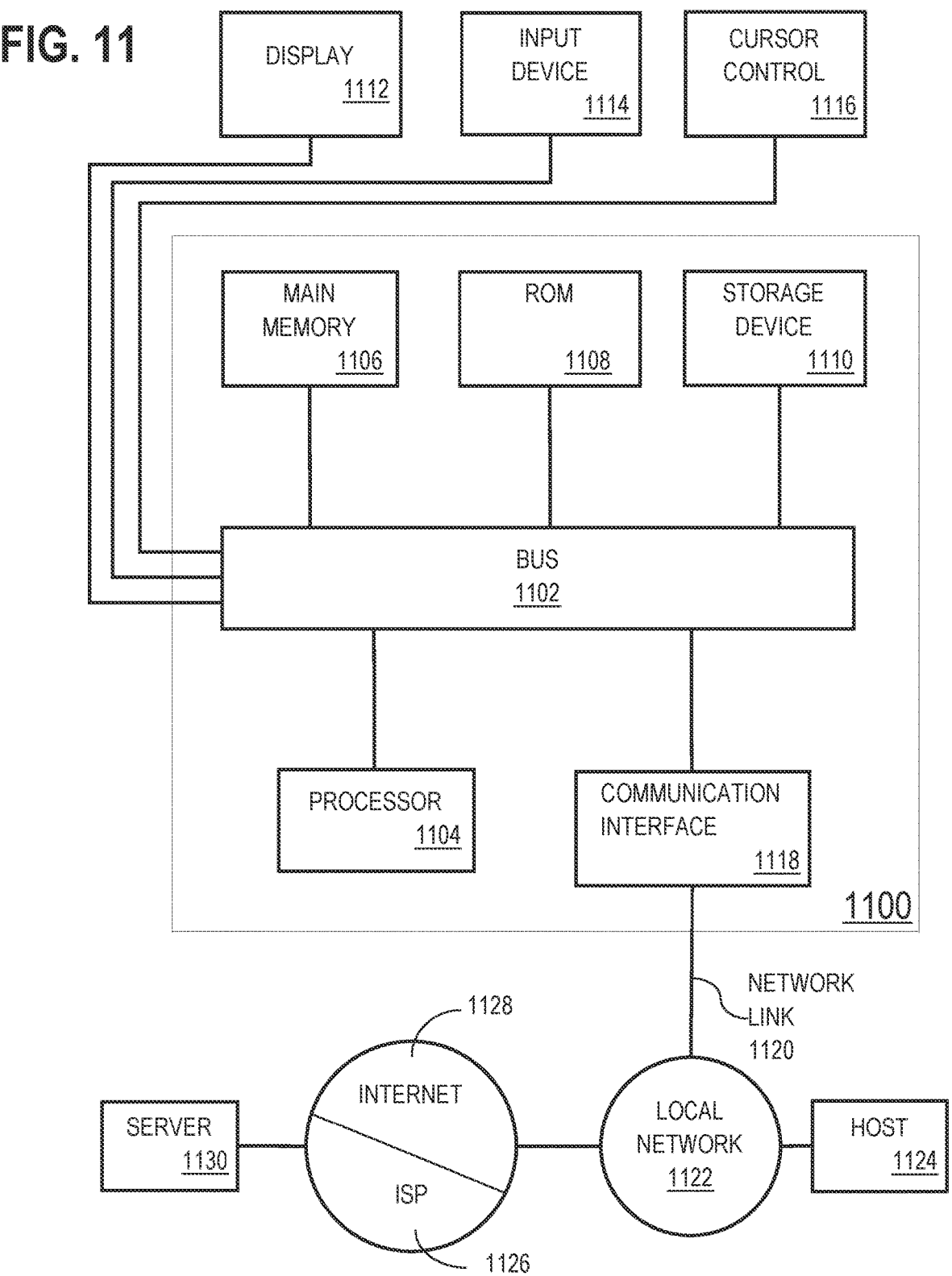
FIG. 11 shows a block diagram illustrating an example computer system in accordance with one or more embodiments.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. One or more non-transitory computer readable media comprising instructions which, when executed by one or more hardware processors, causes performance of operations comprising:
    determining network topology information for a plurality of time periods, the network topology information comprising, for individual time periods of the plurality of time periods:
        a plurality of entities associated with the network topology,
        a plurality of relationships between the plurality of entities, and
        health metrics of the plurality of entities;
    storing, in a historical topology log, the network topology information for the individual time periods in association with the health metrics of the plurality of entities for the individual time periods;
    based on the historical topology log, predicting characteristics of the network topology for a future time period;
    computing a network topology signature based on the predicted characteristics of the network topology for the future time period;
    determining whether the predicted characteristics of the network topology for the future time period meet one or more remediation criteria by applying a set of rules to the network topology signature that is based on the predicted characteristics of the network topology for the future time period;
    determining a remediation plan in response to determining the predicted characteristics of the network topology for the future time period meet the one or more remediation criteria; and
    presenting the remediation plan; and
    generating a candidate topology that is based on the remediation plan by modifying interface elements included in a current topology based on the remediation plan.

2. The one or more non-transitory computer readable media of claim 1, wherein predicting the characteristics of the network topology comprises:
    predicting the characteristics based further on current or predicted relationships in the plurality of relationships.

3. The one or more non-transitory computer readable media of claim 1, wherein the operations further comprise:
    receiving a user input defining the future time period; and
    predicting the characteristics of the network topology at the future time period by modeling behaviors of the entities associated within the network topology using network topology information for a current time period.

4. The one or more non-transitory computer readable media of claim 1, wherein determining the remediation plan comprises:
    identifying one or more candidate remediation plans; and
    applying the set of rules to the one or more candidate remediation plan to select the remediation plan from the one or more candidate remediation plans.

5. The one or more non-transitory computer readable media of claim 1, wherein the operations further comprise;
    training a machine learning model to determine remediation plans for network topologies, wherein data for the training comprises: a particular network topology and a particular remediation plan for the particular network topology; and
    applying the machine learning model to the network topology signature to compute the remediation plan.

6. The one or more non-transitory computer readable media of claim 1, wherein determining the remediation plan comprises:
    identifying a set of candidate remediation plans based on the network topology signature; and
    determining a cost associated with the individual candidate remediation plans of set of candidate remediation plans; and
    selecting the remediation plan, from the set of candidate remediation plans, based on the costs associated with the individual candidate remediation plans of the set of candidate remediation plans.

7. The one or more non-transitory computer readable media of claim 1, wherein the health metrics comprise one or more of the following: requests per second (RPS), uptime, error rates, thread count, CPU usage, memory utilization, or disk usage, average response time, peak response time, object status, problem priority labels, number of restarts, and unbound volumes.

8. The one or more non-transitory computer readable media of claim 1, wherein the remediation plan is selected from as set comprising:
rebooting one or more nodes, deploying a node, removing a node, allocating a node to a service, redirecting traffic to a different node, reconfiguring, a node, modifying a firewall of a node, deleting a workload, reconfiguring a workload, and scaling a workload, modifying a security policy, and generating an alert.

9. The one or more non-transitory computer readable media of claim 1, wherein the predicted characteristics comprise information of the network topology associated with one or more of: events, anomalies, and health issues.

10. A system comprising a hardware processor and computer-readable program instructions that, when executed by the hardware processor, control the system to perform operations, comprising:
determining network topology information for a plurality of time periods, the network topology information comprising, for individual time periods of the plurality of time periods:
a plurality of entities associated with the network topology,
a plurality of relationships between the plurality of entities, and
health metrics of the plurality of entities;
storing, in a historical topology log, the network topology information for the individual time periods in association with the health metrics of the plurality of entities for the individual time periods;
based on the historical topology log, predicting characteristics of the network topology for a future time period;
computing a network topology signature based on the predicted characteristics of the network topology for the future time period;
determining whether the predicted characteristics of the network topology for the future time period meet one or more remediation criteria by applying a set of rules to a network topology signature that is based on the predicted characteristics of the network topology for the future time period;
determining a remediation plan in response to determining the predicted characteristics of the network topology for the future time period meet the one or more remediation criteria; and
presenting the remediation plan; and
generating a candidate topology that is based on the remediation plan by modifying interface elements included in a current topology based on the remediation plan.

11. The system of claim 10, wherein predicting the characteristics of the network topology comprises:
predicting the characteristics based further on current or predicted relationships in the plurality of relationships.

12. The system of claim 10, wherein the operations further comprise:
receiving a user input defining the future time period; and
predicting the characteristics of the network topology at the future time period by modeling behaviors of the entities associated within the network topology using network topology information for a current time period.

13. The system of claim 10, wherein determining the remediation plan comprises:
identifying one or more candidate remediation plans; and
applying the set of rules to the one or more candidate remediation plan to select the remediation plan from the one or more candidate remediation plans.

14. The system of claim 10, wherein the operations further comprise:
training a machine learning model to determine remediation plans for network topologies, wherein data for the training comprises: a particular network topology and a particular remediation plan for the particular network topology; and
applying the machine learning model to the network topology signature to compute the remediation plan.

15. The system of claim 10, wherein determining the remediation plan comprises:
identifying a set of candidate remediation plans based on the network topology signature; and
determining a cost associated with the individual candidate remediation plans of set of candidate remediation plans; and
selecting the remediation plan, from the set of candidate remediation plans, based on the costs associated with the individual candidate remediation plans of the set of candidate remediation plans.

16. The system of claim 10, wherein the health metrics comprise one or more of the following: requests per second (RPS), uptime, error rates, thread count, CPU usage, memory utilization, or disk usage, average response time, peak response time, object status, problem priority labels, number of restarts, and unbound volumes.

17. The system of claim 10, wherein the remediation plan is selected from as set comprising:
rebooting one or more nodes, deploying a node, removing a node, allocating a node to a service, redirecting traffic to a different node, reconfiguring, a node, modifying a firewall of a node, deleting a workload, reconfiguring a workload, and scaling a workload, modifying a security policy, and generating an alert.

18. The system of claim 10, wherein the predicted characteristics comprise information of the network topology associated with one or more of: events, anomalies, and health issues.

19. A method comprising:
determining network topology information for a plurality of time periods, the network topology information comprising, for individual time periods of the plurality of time periods:
a plurality of entities associated with the network topology,
a plurality of relationships between the plurality of entities, and
health metrics of the plurality of entities;
storing, in a historical topology log, the network topology information for the individual time periods in association with the health metrics of the plurality of entities for the individual time periods;
based on the historical topology log, predicting characteristics of the network topology for a future time period;
computing a network topology signature based on the predicted characteristics of the network topology for the future time period;
determining whether the predicted characteristics of the network topology for the future time period meet one or more remediation criteria by applying a set of rules to a network topology signature that is based on the predicted characteristics of the network topology for the future time period;

determining a remediation plan in response to determining the predicted characteristics of the network topology for the future time period meet the one or more remediation criteria; and presenting the remediation plan; and generating a candidate topology that is based on the remediation plan by modifying interface elements included in a current topology based on the remediation plan.

20. The method of claim 19, wherein predicting the characteristics of the network topology comprises:

predicting the characteristics based further on current or predicted relationships in the plurality of relationships.

21. The method of claim 19, further comprising:

receiving a user input defining the future time period; and predicting the characteristics of the network topology at the future time period by modeling behaviors of the entities associated within the network topology using network topology information for a current time period.

22. The method of claim 19, wherein determining the remediation plan comprises:

identifying one or more candidate remediation plans; and applying the set of rules to the one or more candidate remediation plan to select the remediation plan from the one or more candidate remediation plans.

23. The method of claim 19, further comprising:

training a machine learning model to determine remediation plans for network topologies, wherein data for the training comprises: a particular network topology and a particular remediation plan for the particular network topology; and applying the machine learning model to the network topology signature to compute the remediation plan.

24. The method of claim 19, wherein determining the remediation plan comprises:

identifying a set of candidate remediation plans based on the network topology signature; and determining a cost associated with the individual candidate remediation plans of set of candidate remediation plans; and selecting the remediation plan, from the set of candidate remediation plans, based on the costs associated with the individual candidate remediation plans of the set of candidate remediation plans.

25. The method of claim 19, wherein the health metrics comprise one or more of the following: requests per second (RPS), uptime, error rates, thread count, CPU usage, memory utilization, or disk usage, average response time, peak response time, object status, problem priority labels, number of restarts, and unbound volumes.

26. The method of claim 19, wherein the remediation plan is selected from as set comprising:

rebooting one or more nodes, deploying a node, removing a node, allocating a node to a service, redirecting traffic to a different node, reconfiguring, a node, modifying a firewall of a node, deleting a workload, reconfiguring a workload, and scaling a workload, modifying a security policy, and generating an alert.

27. The method of claim 19, wherein the predicted characteristics comprise information of the network topology associated with one or more of: events, anomalies, and health issues.

* * * * *

UNITED STATES PATENT AND TRADEMARK OFFICE
CERTIFICATE OF CORRECTION

PATENT NO. : 12,368,645 B2  
APPLICATION NO. : 18/465732  
DATED : July 22, 2025  
INVENTOR(S) : Vuda et al.

Page 1 of 1

It is certified that error appears in the above-identified patent and that said Letters Patent is hereby corrected as shown below:

In the Specification

In Column 17, Line 50, delete "(QOS)" and insert -- (QoS) --, therefor.

In the Claims

In Column 22, Line 44, in Claim 5, delete "comprise;" and insert -- comprise: --, therefor.

Signed and Sealed this  
Sixteenth Day of December, 2025

John A. Squires  
*Director of the United States Patent and Trademark Office*